United States Patent [19]
Wakeman et al.

[11] Patent Number: 5,594,702
[45] Date of Patent: Jan. 14, 1997

[54] MULTI-FIRST-IN-FIRST-OUT MEMORY CIRCUIT

[75] Inventors: Larry N. Wakeman, Mountain View; Roy T. Myers, Jr., Santa Clara; Wesley C. Lee, San Jose, all of Calif.

[73] Assignee: National Semiconductor Corporation, Santa Clara, Calif.

[21] Appl. No.: 495,867

[22] Filed: Jun. 28, 1995

[51] Int. Cl.$^6$ .............................. G11C 8/00; G06F 15/00; H01J 3/00

[52] U.S. Cl. .............................. 365/230.05; 365/230.08; 365/230.09; 365/239; 395/501; 395/507; 395/516

[58] Field of Search ................. 365/230.05, 230.08, 365/230.09, 239; 395/162, 164, 166, 275

[56] References Cited

U.S. PATENT DOCUMENTS

| | | | |
|---|---|---|---|
| 5,333,274 | 7/1994 | Amini et al. | 395/275 |
| 5,353,403 | 10/1994 | Kohiyama et al. | 395/164 |

OTHER PUBLICATIONS

*International Standard ISO/IEC 8802-3:1992 (Information Technology—Local and Metropolitan Area Networks—Part 3: Carrier Sense Multiple Access with Collision Detection (CSMA /CD) Access Method and Physical Layer Specifications)*, Third Edition, The Institute of Electrical and Electronic Engineers, Inc., 1992, pp. 31-41, 43-47, 49-78, 81-119, and 121-149.

*DP83934 LAN Data Book*, National Semiconductor Corporation, Santa Clara, California, Undated (prior to Jun. 28, 1995), pp. 1-468 to 1-477.

"Document X", Materials submitted under seal which are considered to be proprietary and which are being submitted for consideration under MPEP §724.

*Primary Examiner*—David C. Nelms
*Assistant Examiner*—Trong Phan
*Attorney, Agent, or Firm*—Skjerven, Morrill, MacPherson, Franklin & Friel; Paul J. Winters; Omkar K. Suryadevara

[57] ABSTRACT

A multi-first-in-first-out (henceforth "multi-FIFO") memory circuit in accordance with this invention comprises: (1) a plurality of groups of storage elements, for example, each group corresponds to a first-in-first-out (FIFO) memory (2) a time multiplexed first address generator for generating address signals of a storage element from a first group that is cyclically selected from the plurality of groups by a sequencer included in the first address generator and (3) a second address generator for generating address signals of a number of successive storage elements from a second group that is selected from the plurality of groups by a signal on a group request terminal of the second address generator. In one embodiment the storage elements are part of a dualport random-access-memory (RAM), and are accessed by each of the first and second address generators using a number of pairs of pointer registers that are coupled to the address generators. Each pair of pointer registers includes a read pointer register that indicates a corresponding group's next storage element to be read and a write pointer register that indicates the group's next storage element to be written.

9 Claims, 10 Drawing Sheets

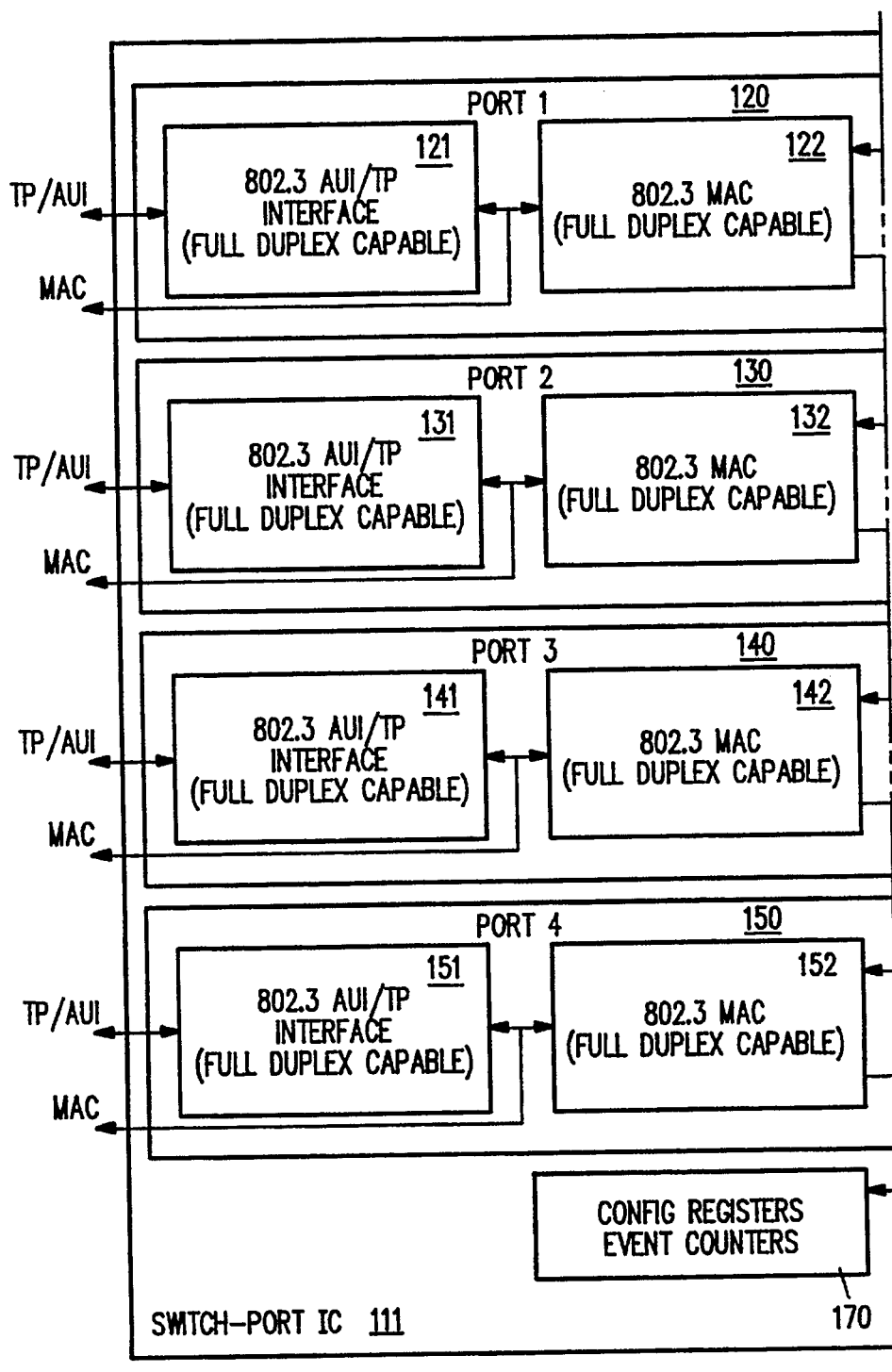
FIG. 1B(1)
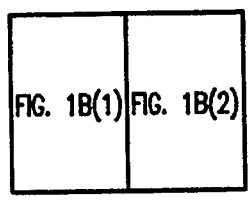
KEY TO FIG. 1B

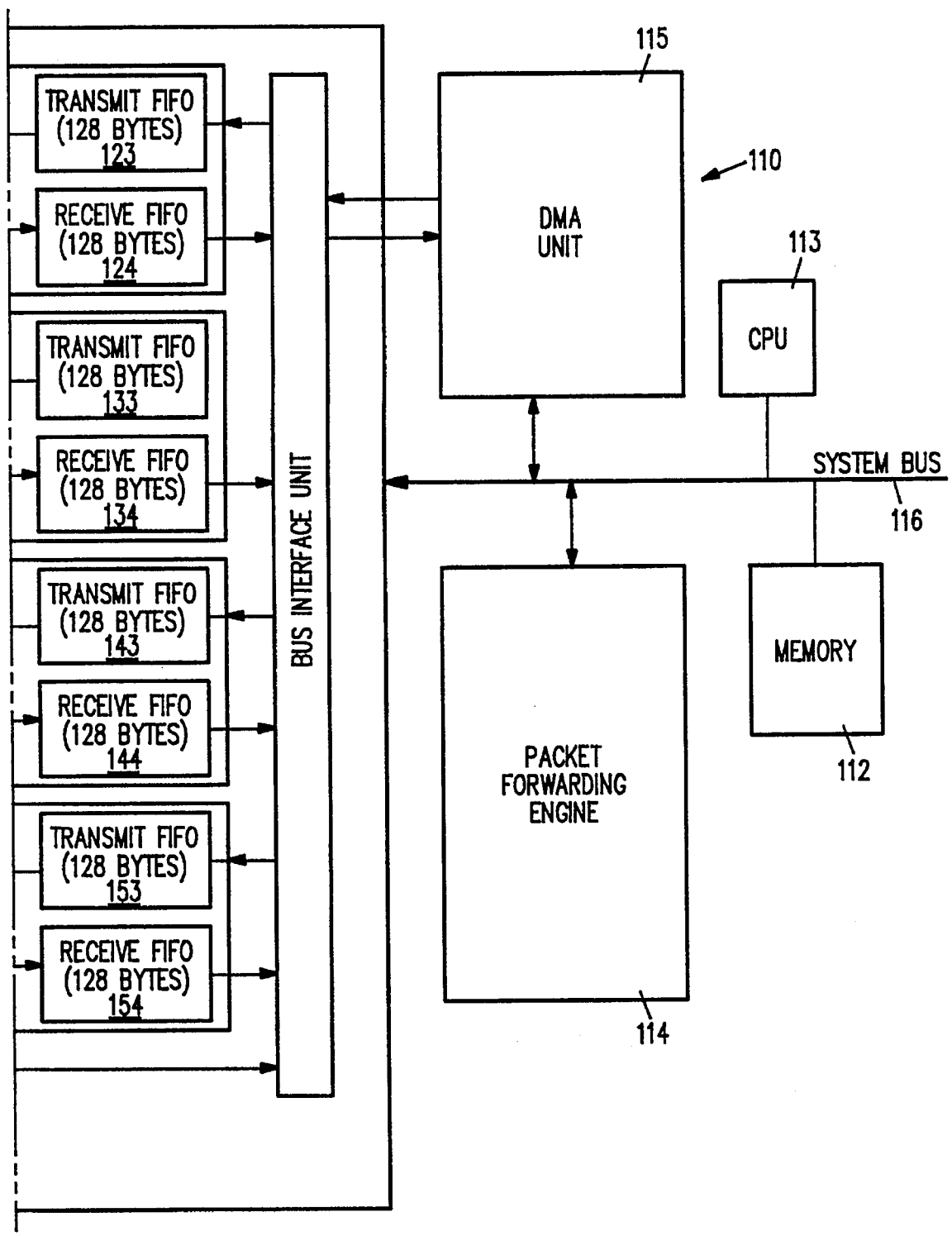
FIG. 1B(2)

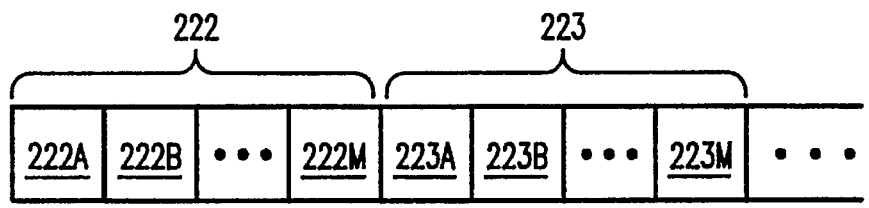
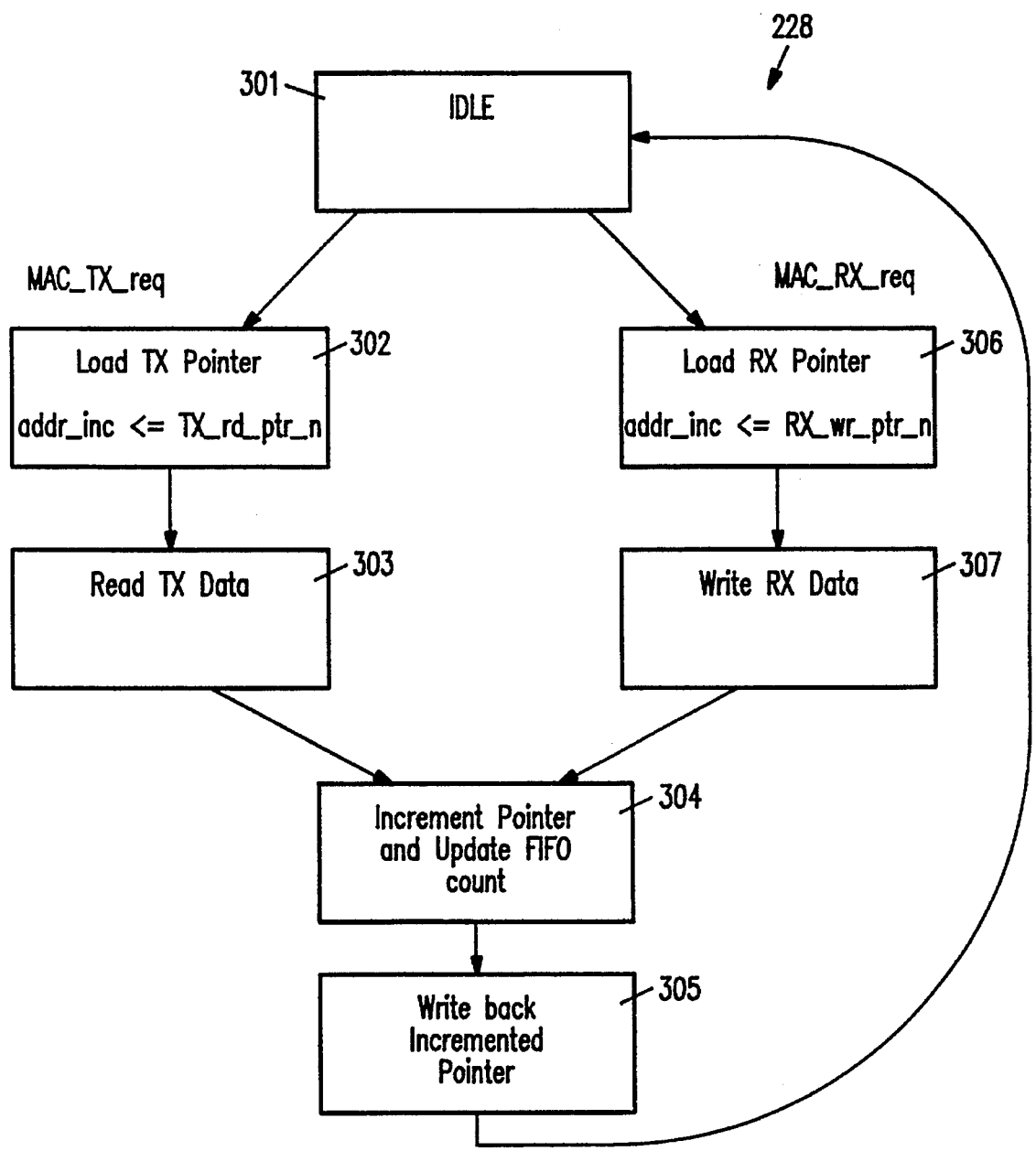
FIG. 2B
FIG. 3A

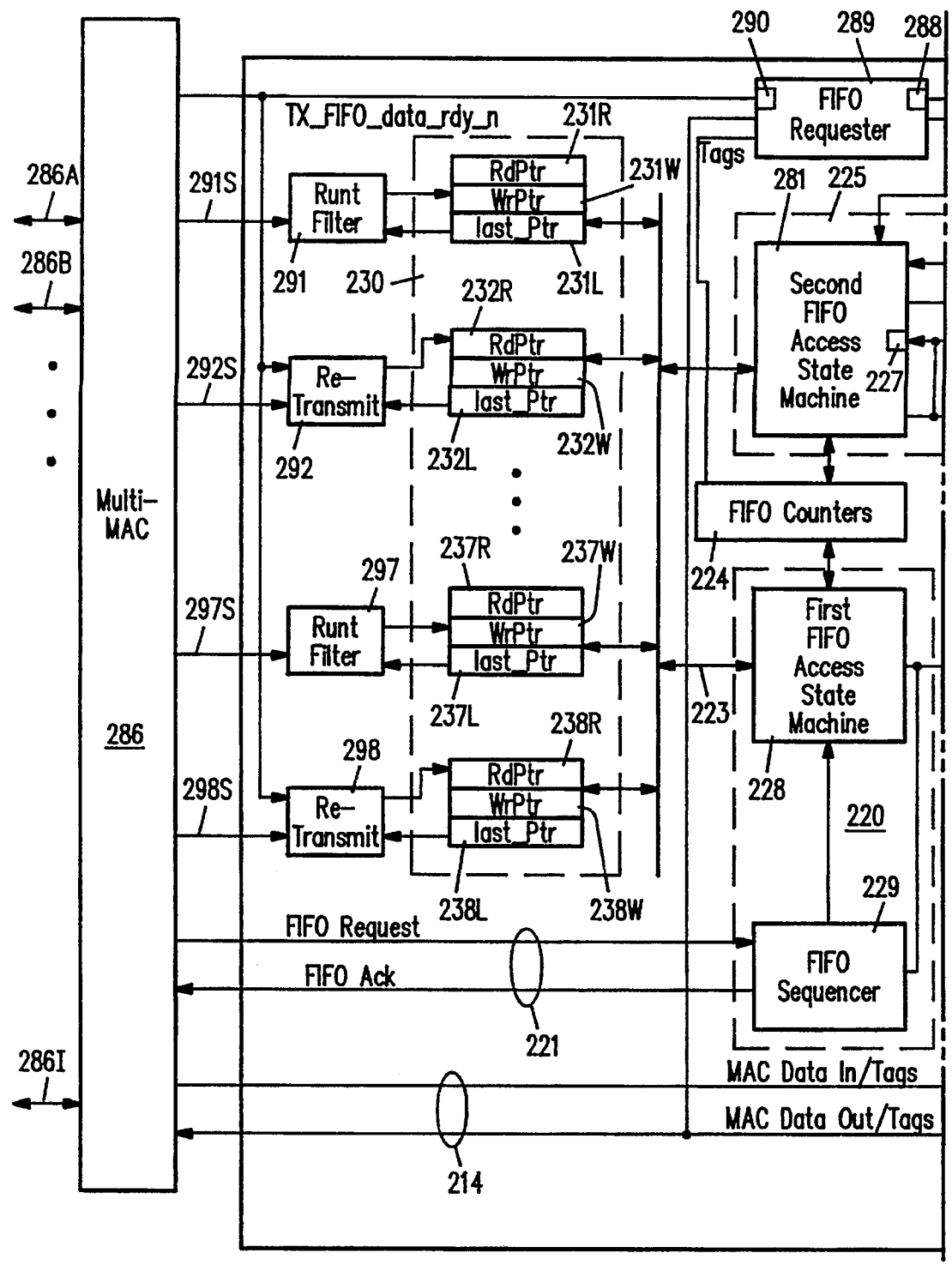
FIG. 2C(1)

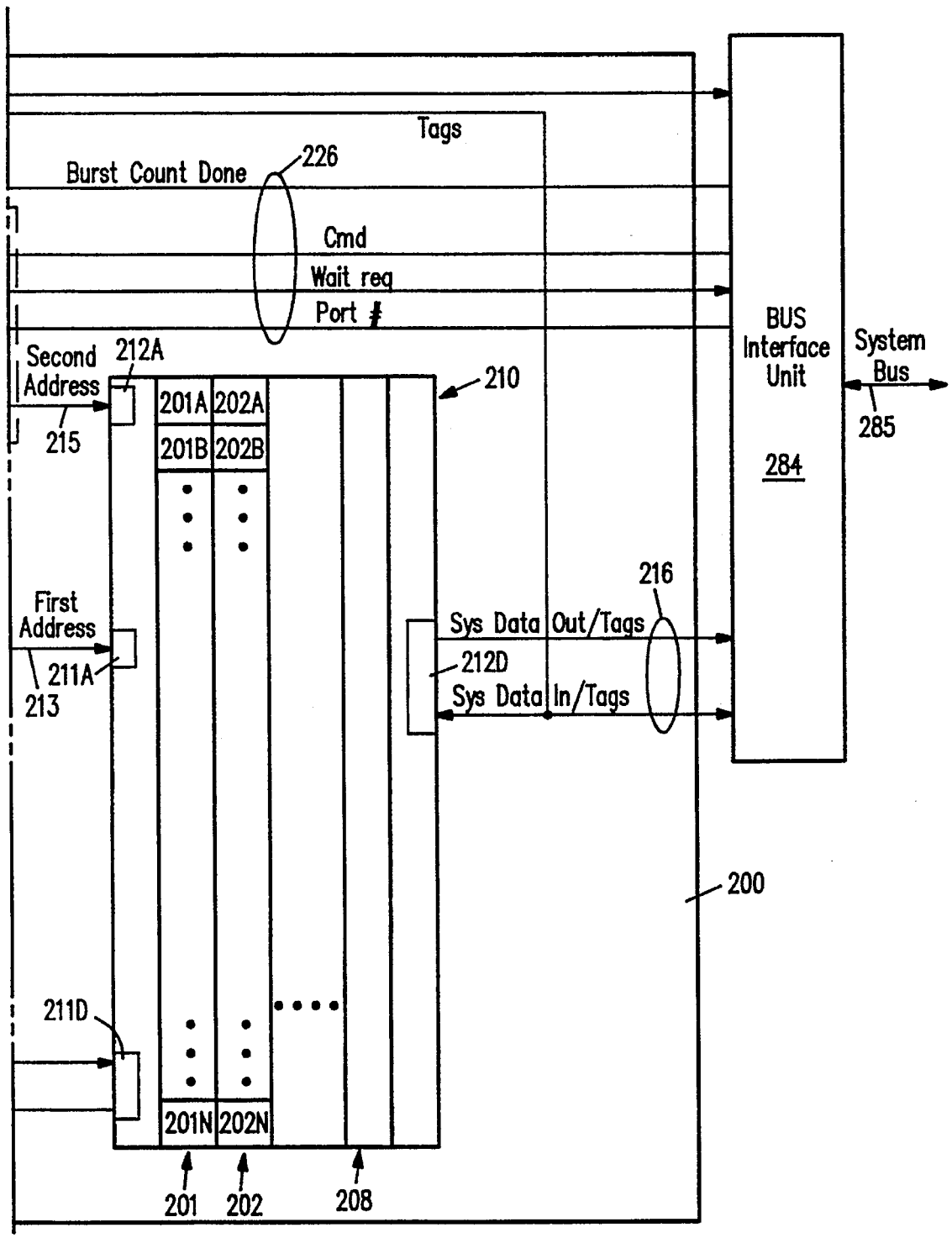
FIG. 2C(2)

MULTI-FIRST-IN-FIRST-OUT MEMORY CIRCUIT

FIELD OF THE INVENTION

The present invention relates to first-in-first-out (FIFO) memories and in particular to a device that includes a number of FIFO memories for buffering data being transferred between buses of different bandwidths.

DESCRIPTION OF RELATED ART

In an example of a prior art networked computer system 100 (FIG. 1A), computers 101–104 can communicate with each other and also access shared resources, such as a printer 105, over one or more networks, such as ethernets 107–109 that interconnect various computers through an ethernet hub 110. Computers 101–104 can be, for example, industry-standard IBM™ PCs or Apple™ Macintoshes™.

Computers 101–104 include ethernet adapter cards 111–114 that exchange data over ethernets 107–109, for example, using a carrier-sense-multiple-access collision-detect (CSMA/CD) protocol, as described in, "International Standard ISO/IEC 8802-3 ANSI/IEEE Std. 802.3", Part 3, Third Edition 1992-03-20, available from IEEE Service Center, 445 Hoes Lane, P.O. Box 1331.

Ethernet hub 110 can serve as a repeater for communications between computers 101, 102 and 104 that are all coupled to the same ethernet 107. Ethernet hub 110 can also serve as a switch that routes packets based on destination address, between computer 103 on ethernet 108, computers 101, 102 and 104 on ethernet 107 and other computers (not shown) on ethernet 109.

FIG. 1B illustrates one example of an ethernet hub 110 that includes a switch-port integrated circuit (switch-port IC) 111, a memory 112 that stores packets, a central processing unit (CPU) 113 that monitors and controls various components, a packet forwarding engine 114 that forwards packets from one port to another port and a direct-memory-access (DMA) unit 115 that transfers packets between switch port 1C 111 and memory 112. All these components are coupled to each other by a system bus 116. System bus 116 can be any bus, such as a peripheral component interconnect (PCI) bus or other proprietary implementation.

Ethernet hub 110 can be coupled to a twisted pair cable, coax cable, fiber optic link or other physical media of an ethernet (such as ethernet 107) through an ethernet port 120 on switch-port IC 111. Ethernet port 120 includes an attachment unit interface (AUI) or twisted pair (TP) transceiver 121, a media access controller unit (MAC) 122, a transmit first-in-first-out memory (FIFO) 123 and a receive-first-in-first-out memory (FIFO) 124.

Switch-port IC 111 can include a number of such ethernet ports, for example ethernet port 130 (including AUI/TP transceiver 131, MAC unit 132, transmit FIFO 133 and receive FIFO 134), ethernet port 140 (including AUI/TP transceiver 141, MAC unit 142, transmit FIFO 143 and receive FIFO 144) and ethernet port 150 (including AUI/TP transceiver 151, MAC unit 152, transmit FIFO 153 and receive FIFO 154). Each of ethernet ports 120, 130, 140 and 150 may be coupled by a direct memory access (DMA) interface unit 115 (which may be part of the same IC 111, or may be in a separate IC) to system bus 116. Switch-port IC 111 also includes configuration registers and event counters 170 for supporting various network management functions.

Such a conventional ethernet hub 110 can be built using, for example as switch-port IC 111, the 4-Channel Quad 84C300 AutoDUPLEX™ CMOS Ethernet 10/100 Mega Bit/Sec Data Link Controllers available from Seeq Technology, Inc., 47131 Bayside Parkway, Fremont, Calif. 94538.

Improvements in ethernet hub components, such as switch-port ICs are always being sought.

SUMMARY OF THE INVENTION

A multi-first-in-first-out (henceforth "multi-FIFO") memory circuit in accordance with this invention time multiplexes the use of circuitry (such as a first address generator) to store and retrieve data that is being transferred between a number of network segments.

In one embodiment, the multi-FIFO includes a plurality of groups of storage elements included in a dual ported random-access-memory (RAM), each group representing a first-in-first-out memory (FIFO) and a first address generator for generating address signals of a storage element from one group that is selected in one time slot, another group that is selected in the next time slot and so on, in a sequential roll-over (i.e. cyclic) fashion. A cycle period is the total time for the first address generator to completely cycle through selecting each group in the multi-FIFO. At the beginning of a new cycle period, the first address generator returns to generate address signals of another storage element from the group that was first selected in the previous cycle period. The order of selection of groups is predetermined, and each group is selected only once during a given cycle period.

The multi-FIFO also includes a second address generator for sequentially generating address signals of a number of successive storage element from a group that is selected by a signal on a group request terminal of the second address generator.

Each of the first and second address generators use a number of sets of pointer registers, with each set corresponding to a group. Each set of pointer registers includes a read pointer register that indicates the corresponding group's next storage element to be read, a write pointer register that indicates the group's next storage element to be written, and a last pointer register that indicates the most recent storage element that was part of a valid block of data, the data block being read or written depending on whether the group is a receive group or a transmit group. Use of only one pair of address generators for a plurality of FIFOs saves real estate otherwise occupied by separate address generators used in conventional FIFOs.

BRIEF DESCRIPTION OF THE DRAWINGS

FIG. 1B (formed by appending FIGS. 1B(1) and 1B(2)) illustrates in a schematic block diagram, the ethernet hub of FIG. 1A.

FIGS. 2A and 2C (formed by appending FIGS. 2C(1) and 2C(2)) illustrate in a high-level and low-level block diagrams respectively, one embodiment of a multi-first-in-first-out memory of this invention.

FIG. 2B illustrates a number of cycle periods during each of which the first address generator of FIGS. 2A and 2C is time multiplexed.

FIGS. 3A–3D illustrate first and second-address state machines, a runt filter and a retransmit circuit respectively.

DETAILED DESCRIPTION

Figure 2A:
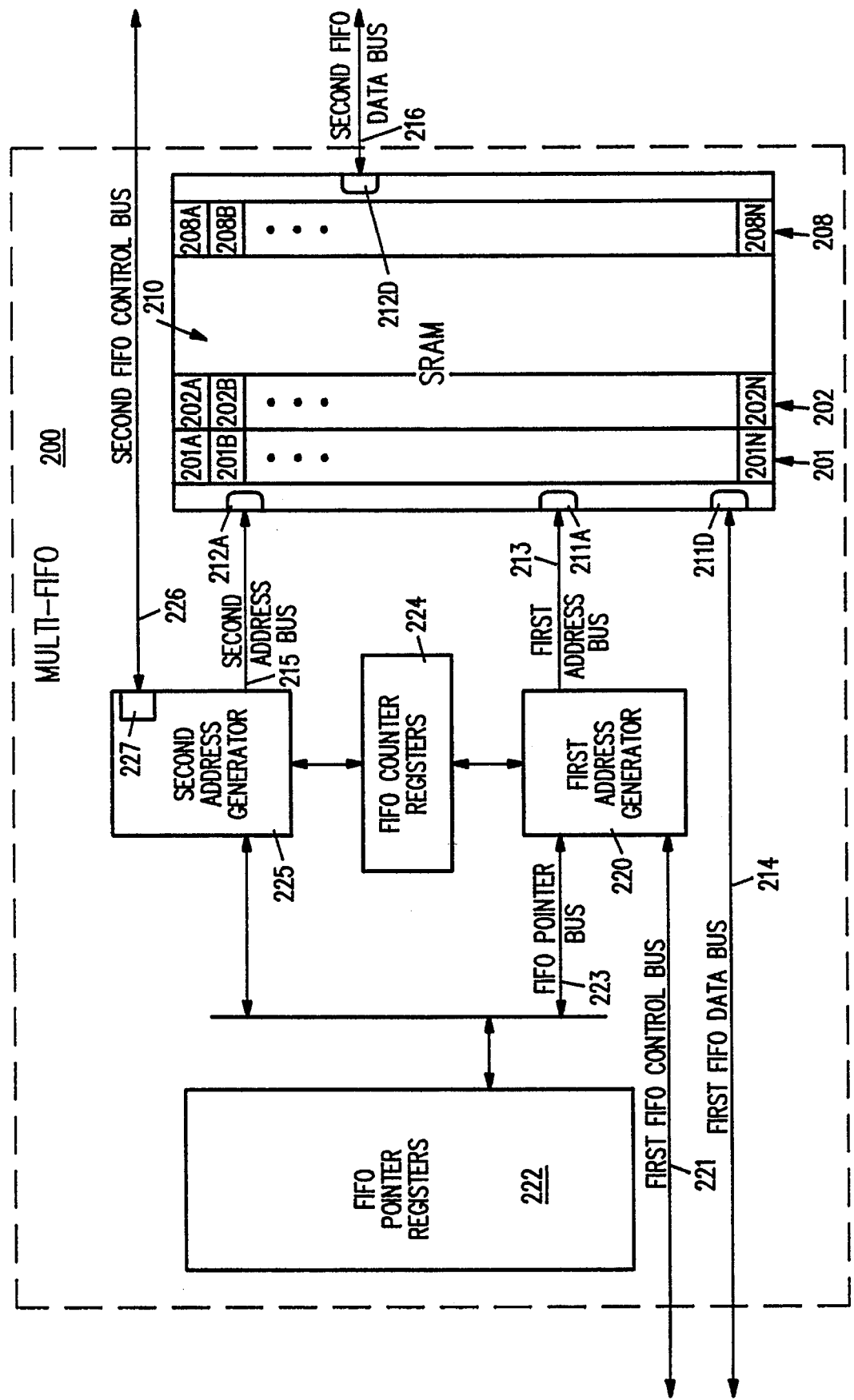

A multi-first-in-first-out (henceforth "multi-FIFO") memory circuit 200, illustrated in FIG. 2A for one embodiment of this invention, includes a number of storage elements, such as memory locations 201A–201N, that logically form a group 201 that represents a first-in-first-out memory (FIFO), for example, a receive FIFO, wherein N represents the total number of storage elements in the group. Similarly, multi-FIFO memory circuit 200 also includes memory locations 202A–202N to 208A–208N, that respectively form groups 202–208, and that respectively represent various transmit and receive FIFOs.

Although only eight groups 201–208 are illustrated in FIG. 2A, one receive group and one transmit group for four ports, any number of groups for any number of ports can be used in a multi-FIFO memory circuit 200 in other embodiments of this invention.

All groups 201–208 of memory locations 201A–208N in multi-FIFO memory circuit 200 are physically located near each other in a dual ported static random-access-memory (SRAM) 210. SRAM 210 is dual-ported with a number of first address terminals 211A coupled to a first address bus 213, a number of first data terminals 211D coupled to a first FIFO data bus 214, a number of second address terminals 212A coupled to a second address bus 215 and a number of second data terminals 212D coupled to a second FIFO data bus 216.

A first address generator 220 that is coupled to first address bus 213 can generate address signals for FIFO RAM 201, in response to an active signal on first FIFO control bus 221. SRAM 210 can supply data signals on first data terminals 211D (coupled to first FIFO data bus 214) that are driven by data values stored in a storage element identified by first address signals received on first address terminals 211A.

SRAM 210 can also supply data signals on second data terminals 212D driven by data values stored in a storage element identified by second address signals received on second address terminals 212A. Similarly, SRAM 210 can use data signals received on first data terminals 211D to store data values in a storage element identified by first address signals received on said first address terminals 211A, and use data signals received on second data terminals 212D to store data values in a storage element identified by second address signals received on second address terminals 212A.

First address generator 220 generates address signals of a storage element from one group (e.g. group 201) in one time slot 222A (FIG. 2B), a storage element from another group (e.g. group 202) in the next time slot 222B and so on, in a sequential roll-over (i.e. cyclic) fashion. A cycle period 222 is the total time for first address generator 220 to completely cycle through selecting each group 201–208 in multi-FIFO 200 (i.e. the total of time slots 222A–222M, where M is the number of groups, in this embodiment eight). At the beginning of a new cycle period 223, first address generator 220 returns to generate address signals of another storage element from the group (e.g. group 201) that was first selected in the previous cycle period 222. The order of selection of groups 201–208 is predetermined, and each group is selected only once during a given cycle period.

Use of first data terminals 211D is time division multiplexed, with one time interval for each group 201–208, so that data can be cyclically written into or read from groups 201–208. In one specific embodiment, the time interval is four clock cycles that are required for first address generator 220 to read a selected group's pointer from FIFO pointer registers 222 via FIFO pointer bus 230, increment the read pointer and update the incremented pointer back into FIFO pointer registers 230. First address generator 220 increments all pointers in a roll-over fashion and re-uses a pointer only in the next cycle.

Although in this embodiment four clock cycles are required in a time interval for using first data terminals 211D, the time interval can be reduced to a single clock cycle in other embodiments, for example by pipelining the implementation of first address generator 220. Such pipelining is well known to a person of skill in the art.

In addition to updating FIFO pointer registers 230, first address generator 220 also updates (e.g. increments or decrements as appropriate) a counter value stored in FIFO counter registers 224 that indicates the number of storage elements in SRAM 210 containing valid data values for one of groups 201–208. FIFO pointer registers 230 and FIFO counter registers 224 are also used by a second address generator 225 that is coupled to second address bus 215. A FIFO counter register is kept unchanged if both the first address generator 220 and the second address generator 225 access a storage element from the same group.

In response to an active signal on second FIFO control bus 226 that is coupled to a group request terminal 227, second address generator 225 sequentially generates address signals of a number of successive storage elements from a group that is selected by the active signal. For example, if the active signal on bus 226 indicates group 201, second address generator 225 sequentially generates several addresses of storage elements 201A–201N. The starting address depends a pointer signal from FIFO pointer registers 230 and the number of generated addresses depends on a count signal from FIFO counter registers 224 and on a burst count signal received on bus 226.

First address generator 220 includes a first FIFO access state machine 228 (FIG. 2C) that is driven by a FIFO sequencer 229. To form the first address signals, first address generator 220 uses FIFO sequencer 229 to select one of groups 201–208 cyclically, in a time-multiplexed fashion and a selected group's number becomes the index into SRAM 210. Specifically, in one embodiment, two high order bits of a storage location's address are formed by the selected group's number. For example, if group 202 is selected, the high order bits are 01.

First FIFO access state machine 228 then generates the low order bits of a storage location's address using a pointer that is stored in FIFO pointer registers 230 (FIG. 2A) that multi-FIFO memory circuit 200 maintains for each of groups 201–208. Specifically, multi-FIFO memory circuit 200 maintains at least two pointer registers for each of the groups 201–208: read pointer registers 231R–238R (FIG. 2C) that indicate the next storage location to be read and write pointer registers 231W–238W that indicate the next storage location to be written.

In this embodiment, multi-FIFO memory circuit 200 also maintains last pointer registers 231L–238L that indicate the most recent storage location that was part of a valid block of data, the data block being either read or written depending on whether a group is a receive group or a transmit group (discussed below). To avoid overwriting of data, the read and write pointer registers can only be incremented up to the value in the last pointer register.

Figure 3B:
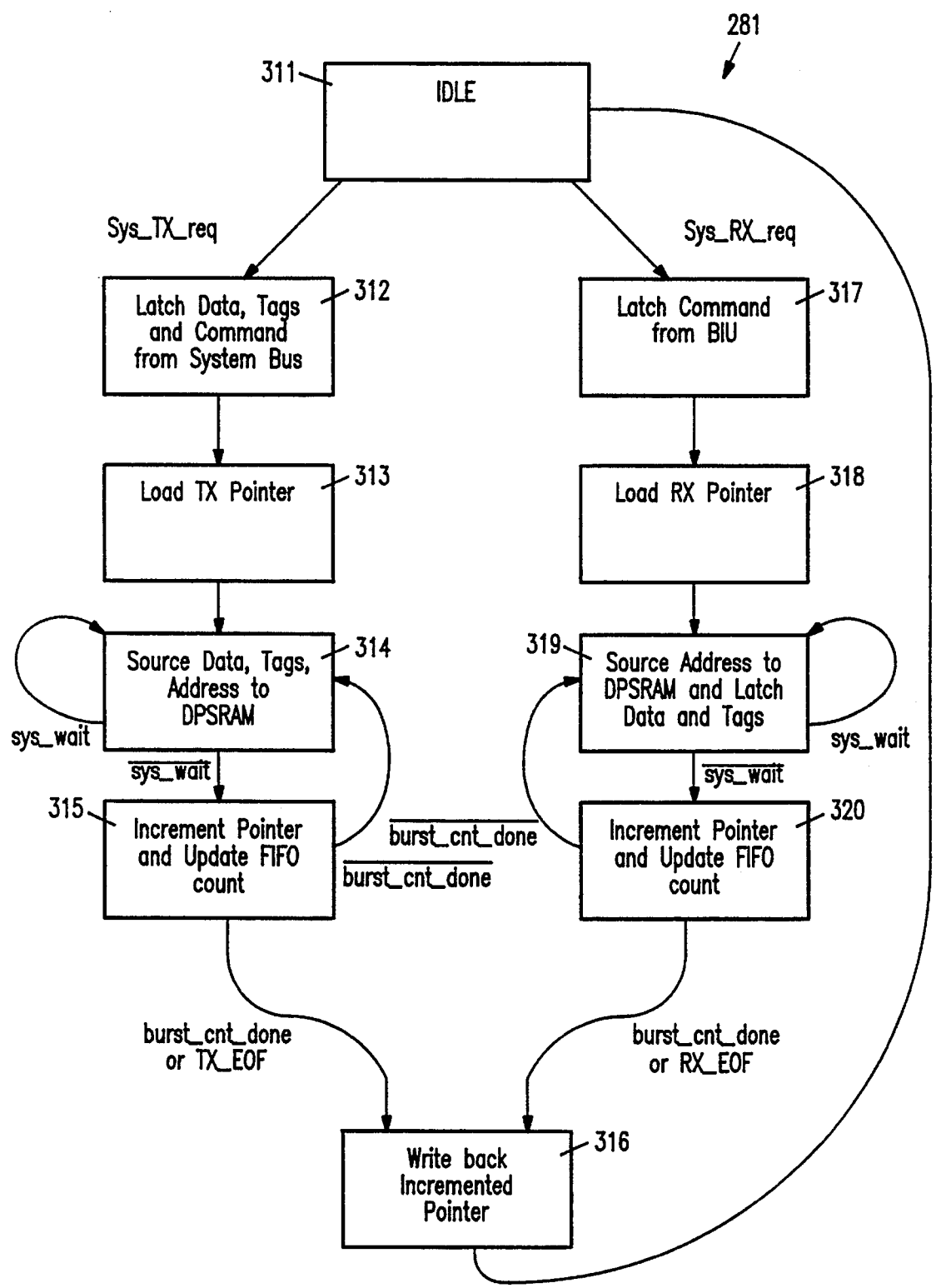

In one specific embodiment, during a time slot (e.g. slot 222A in FIG. 2B), first FIFO access state machine 228 performs the following steps illustrated in FIG. 3A. First FIFO access state machine 228 transitions from idle state 301 to state 302 or 306, depending on whether a FIFO request signal on first FIFO control bus 221 is first transmit request signal MAC_TX_req for addressing a transmit group (e.g. group 202) or first receive request signal MAC_RX_req for addressing a receive group (e.g. group 201).

In state 302 or 306, depending on the selected group, such as group 201 or 202, first FIFO access state machine uses a pointer that is stored in, for example, write pointer register 231W, or read pointer register 232R to generate the low order bits and then concatenates them with high order bits (i.e. the selected group's number discussed above) to form the first address signals of a storage element to be accessed in SRAM 210. For example, if a second storage element in group 202 contains the next data to be transmitted, an address 0001 can be retrieved from read pointer register 232R, to form the low order bits that are concatenated with high order bits 01 to form address signals 010001 that address storage location 202B in SRAM 210. For each group selected by sequencer 229, first address generator 220 generates address signals of a storage element in the group in the manner described above, irrespective of the group that is selected.

At the next clock signal, in state 303 or 307, SRAM 210 supplies data from the addressed storage element at terminals 211D or alternatively writes data from terminals 211D into the addressed storage element.

At the next clock cycle, in state 304 (commonly reached from either state 303 or 307) first FIFO access state machine 228 increments on a roll-over basis the selected group's (e.g. group 201's or group 202's) loaded pointer. In this same clock cycle, first FIFO access state machine 228 also loads and increments or decrements as appropriate, the selected group's counter in registers 224.

Then at the next clock cycle, in state 305 first FIFO access state machine 228 stores the incremented pointer into the selected group's pointer register (e.g. register 231W or register 232R) and returns to idle state 301.

In subsequent time slots (e.g. slots 222B-222M), first FIFO access state machine 228 repeats the operations described above, alternating between states sequence 301-302-303-304-305 and states sequence 301-306-307-304-305 and to generate the address of one storage element in each successive group 202, 203, 204, 205, 206, 207 and 208.

In this specific embodiment, the read and write pointer registers 231R-238R (FIG. 2C) and 231W-238W all have the same width of 5 bits that is just sufficient to address 32 storage locations, so that when each storage location can store 4 bytes, a total of 128 bytes are stored in a group. Therefore, when a pointer is incremented beyond the last storage element (e.g. location 201N) in a group (e.g. group 201), the pointer rolls-over to the first storage element (e.g. location 201A) in that same group. Such roll-over incrementing eliminates the need to keep track of a group's beginning pointer, a group's ending pointer and to update from the ending pointer to the beginning pointer on roll-over.

Second address generator 225 includes a second state machine 281 that selects one of groups 201-208, for example group 202, in response to an active signal received on a group request terminal 227. Then second state machine 281 uses an appropriate pointer, for example a write pointer stored in register 232W corresponding to group 202, to start generation of address signals of group 202's storage elements that are available to receive data.

In one specific embodiment, during a four clock cycle time slot 222A (FIG. 2B), second FIFO access state machine 281 (FIG. 3B) transitions from idle state 311 to state 312 or 317 depending on whether a command signal on second FIFO control bus 226 is second transmit request signal SYS_TX_req for addressing a transmit group (e.g. group 202) or second receive request signal SYS_RX_req for addressing a receive group (e.g. group 201).

In state 312 or 317, depending on the selected group, such as group 201 or 202, second FIFO access state machine 281 latches command signals on second FIFO control bus 226 from the bus interface unit. At the next clock signal, in state 313 or 318 second FIFO access state machine 281 loads a pointer that is stored in, for example, read pointer register 231R, or write pointer register 232W.

At the next clock signal, in state 314 or 319 second FIFO access state machine 281 uses the loaded pointer to generate the low order bits and then concatenates them with high order bits from an active signal received on group request terminal 227 (i.e. the selected group's number discussed above) to form the second address signals of a storage element to be accessed in SRAM 210. The address calculation by second FIFO access state machine 281 is similar to that discussed above for first FIFO access state machine 228.

During the next clock cycle, SRAM 210 stores signals from second data terminals 212D into the addressed storage element, or alternatively uses stored data from the addressed storage element to drive signals on second data terminals 212D.

Second FIFO access state machine 281 remains in state 314 or 319 if a wait request command signal sys_wait on second FIFO control bus 226 is active. When signal sys_wait goes inactive, second FIFO access state machine 281 goes to state 315 or 320 and increments the used pointer. In state 315 or 320, second FIFO access state machine 281 also updates a corresponding FIFO counter register 224.

If a command signal burst_cnt_done on second FIFO control bus 226 is inactive, second FIFO access state machine 281 returns to the previous state 314 or 319 respectively and generates an address of the next storage element in the selected group. Therefore, for block transfers, second state machine 281 can repeat the operations described above in states 314-315 or 319-320 for a predetermined burst count number of times (for example four times) to generate addresses of successive storage elements within the same group 202, such as locations 202A, 202B and 202C.

The predetermined burst count number can be set during initialization of second state machine 281 by a system (not shown) that is coupled by second FIFO control bus 226 to a bus interface unit 284 (FIG. 2C) in one specific embodiment. After the predetermined burst count number of repetitions, command signal burst_cnt_done goes active and second FIFO access state machine 281 goes from either of states 315 or 320 to state 316 and writes the incremented pointer back into FIFO pointer registers 222. From state 316, second FIFO access state machine 281 returns to idle state 311.

In this specific embodiment, a system (not shown) is coupled by system bus 285 to bus interface unit 284. Also in this embodiment, FIFO sequencer 229 is coupled by first FIFO control bus 221 to a multi-media-access-controller (multi-MAC) 286 that is in turn coupled to network segments 286A–286I, where I is the number of network segments. Multi-FIFO 200 can be part of a ethernet switch that buffers data received on network segments 286A–286I in receive groups 201, 203, 205 and 207 in SRAM 210 until the data can be transferred, for example in a burst, over system bus 285. Multi-FIFO memory circuit 200 can also buffer in transmit groups 202, 204, 206 and 208 data that is received on system bus 285 and that needs to be transmitted on one of network segments 286A–286N. Protocol for transferring data on system bus 285 is implemented in bus interface unit (BIU) 284 that conforms to the architecture of bus 285, such as peripheral component interconnect (PCI) architecture. Such a BIU 284 can be built by a person of skill in the art in view of the enclosed disclosure.

A network protocol, such as CSMA/CD protocol for transferring data on network segments 286A–286I is implemented in multi-MAC 286 that conforms to the architecture of network segments 286A–286I. In one specific embodiment, multi-MAC 286 is described in a jointly-owned, concurrently filed, copending U.S. patent application Ser. No. 08/496,038 filed on Feb. 28, 1995 Attorney Docket Number NS-2803, entitled "A Multi-Media-Access-Controller Circuit For A Network Hub" filed by Wakeman et al. that is incorporated herein by reference in its entirety.

Figure 1A:
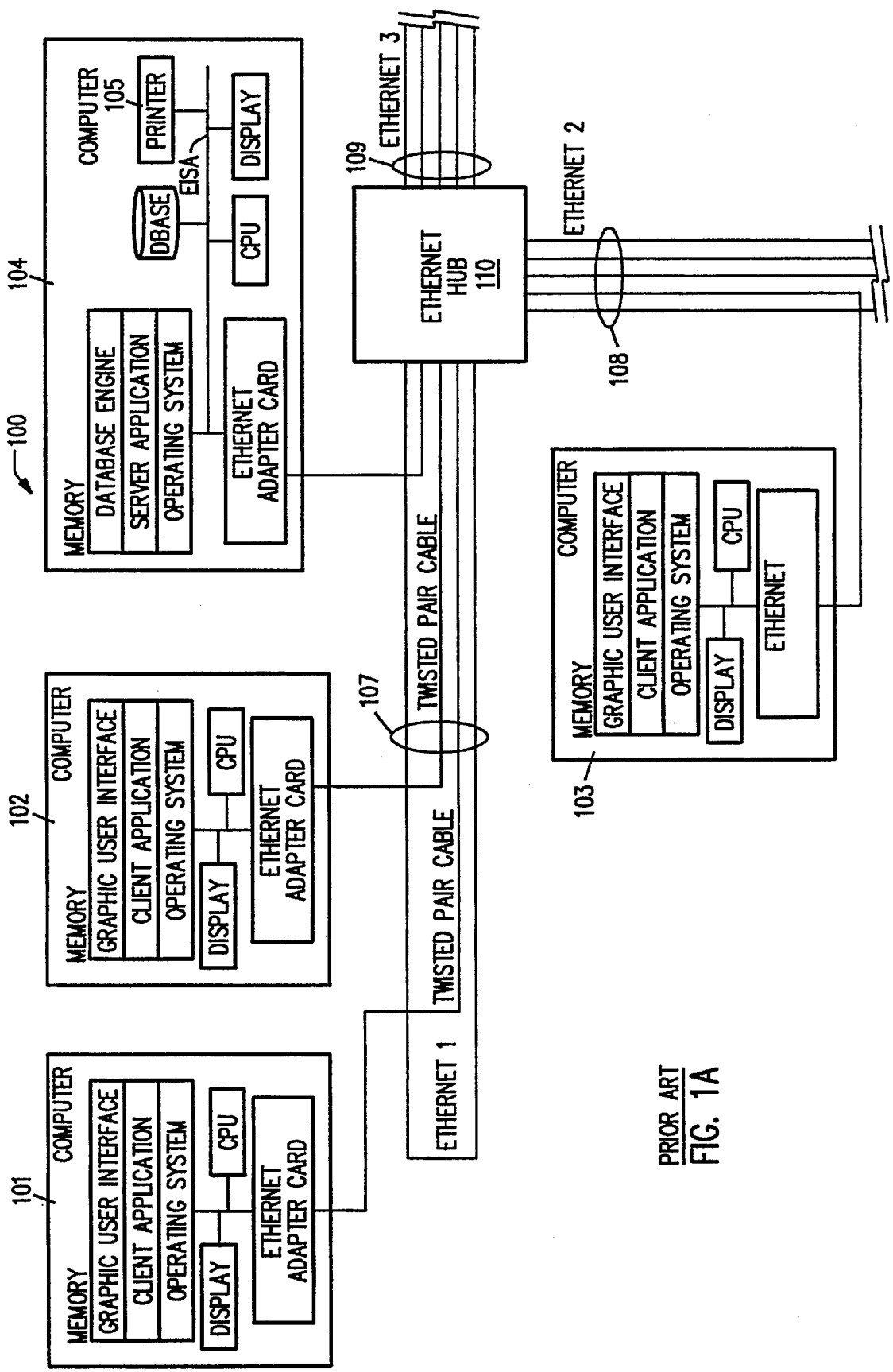
FIG. 1A illustrates in schematic block diagram, a prior art networked computer system.

In this embodiment, as packets are received by multi-MAC 286, data is stored in 128-byte groups 201–208 of multi-FIFO 200. Data is stored in groups 201–208 until a predetermined system-receive threshold number is crossed (minimum number of bytes stored in the group), at which time a receive request signal on a receive FIFO request port 288 is asserted by a FIFO requester 289. FIFO request ports 288 and 290 are coupled respectively to bus interface unit 284 and to multi-MAC 286. Bus interface unit 284 conveys the receive request signal to a system coupled to bus 285 (similar to CPU 113 of FIG. 1B) and the system then reads the data by driving the appropriate signals on address and control lines coupled to BIU 284.

The receive request signal to the system is deasserted if the number of words in multi-FIFO 200 drops below the predetermined receive threshold number. The request signal to the system on port 288 can also be asserted by requester 289 if more than one EOF signal is written to the respective group in multi-FIFO 200.

Requester 289 can assert a transmit request signal to the system on port 288 when the number of empty locations in the respective group in multi-FIFO 200 exceeds a predetermined system-transmit threshold number and otherwise deassert this signal. Also, requester 289 can assert a transmit request signal on port 290 when a predetermined MAC-transmit threshold number is exceeded or if an EOF signal has been written into the respective group in multi-FIFO 200, and deassert this signal when the group is empty.

In this embodiment, first address generator 220 buffers data received from or transmitted to network segments 286A–286I in an M number of groups (e.g. 8 groups), where M=2 * I, with one receive group and one transmit group coupled to each network segment (which is 4 in this example). First address generator 220 therefore cycles through only write pointer registers 231W, 233W, ... for receive groups 201, 203 ... and only through read pointer registers 232R, 234R ... for transmit groups 202, 204 ....

In this specific embodiment, multi-FIFO memory circuit 200 also includes a number of pointer reset circuits 291–298 (FIG. 2C) such as runt filter circuit 291 and retransmit circuit 292, that reset a corresponding pointer from last pointer registers 231L–238L. Therefore, when runt filter circuit 291 detects a runt packet, for example due to collision during reception of data from bus 286A that is signaled by multi-MAC 286 on status bus 291S, runt filter circuit 291 copies the pointer stored in last pointer register 231L in to the write pointer register 231W. In a similar manner, retransmit circuit 292 copies the pointer stored in last pointer register 232L in to the read pointer register 232R if there is a collision during transmission of data from transmit group 202 on bus 286A.

Figure 3C:
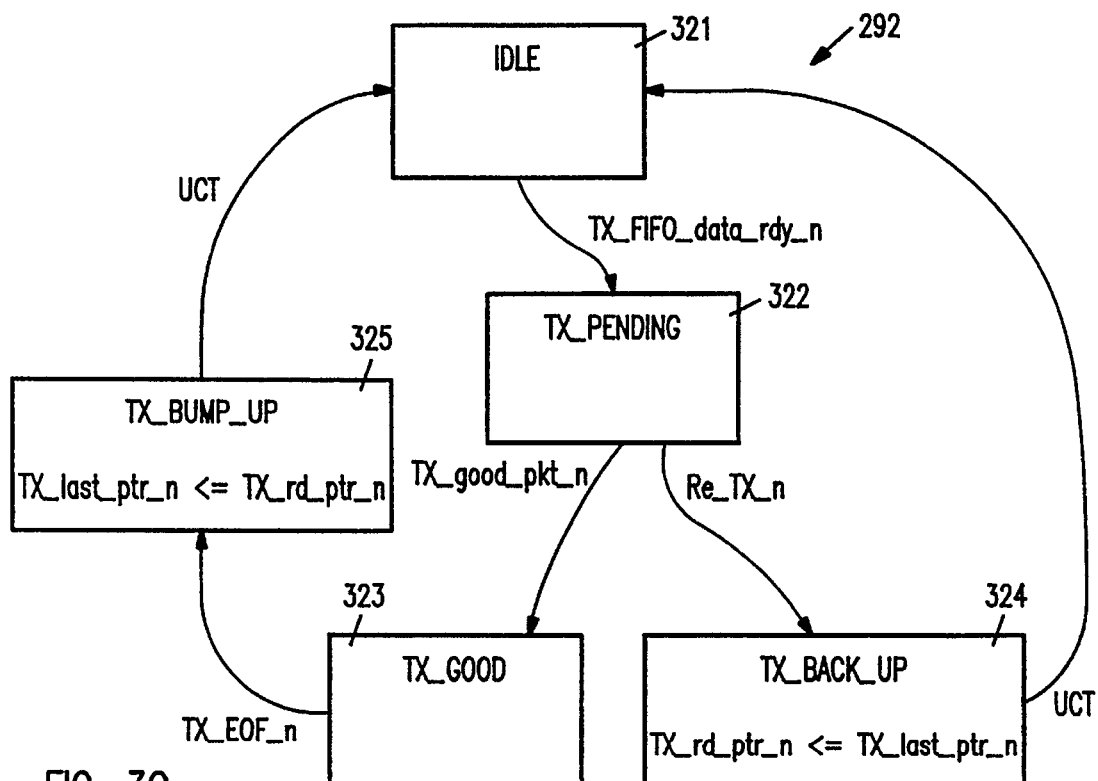

Specifically, retransmit circuit 292 (FIG. 3C) goes from idle state 321 to transmit pending state 322 when a transmit FIFO data ready signal TX_FIFO_data_rdy_n from FIFO requester 289 goes active. Retransmit circuit 292 stays in state 322 while multi-MAC 286 transmits data. Then retransmit circuit 292 goes from state 322 to transmit good state 323 when a transmit good packet signal TX_good_pkt_n on status bus 292S goes active or alternatively to transmit backup state 324 when a retransmit signal Re_TX_n on status bus 292S goes active.

Retransmit circuit 292 stays in transmit good state 323 until a transmit end of frame signal TX_EOF_n on status bus 292S and then goes to transmit bump up state 325. In state 325, retransmit circuit 292 updates last pointer 232L to the value of read pointer 232R and then unconditionally transfers (labeled UCT in FIG. 3C) to idle state 321.

In state 324, retransmit circuit 292 updates read pointer 232R to the value of last pointer 232L and then unconditionally transfers to idle state 321.

Figure 3D:
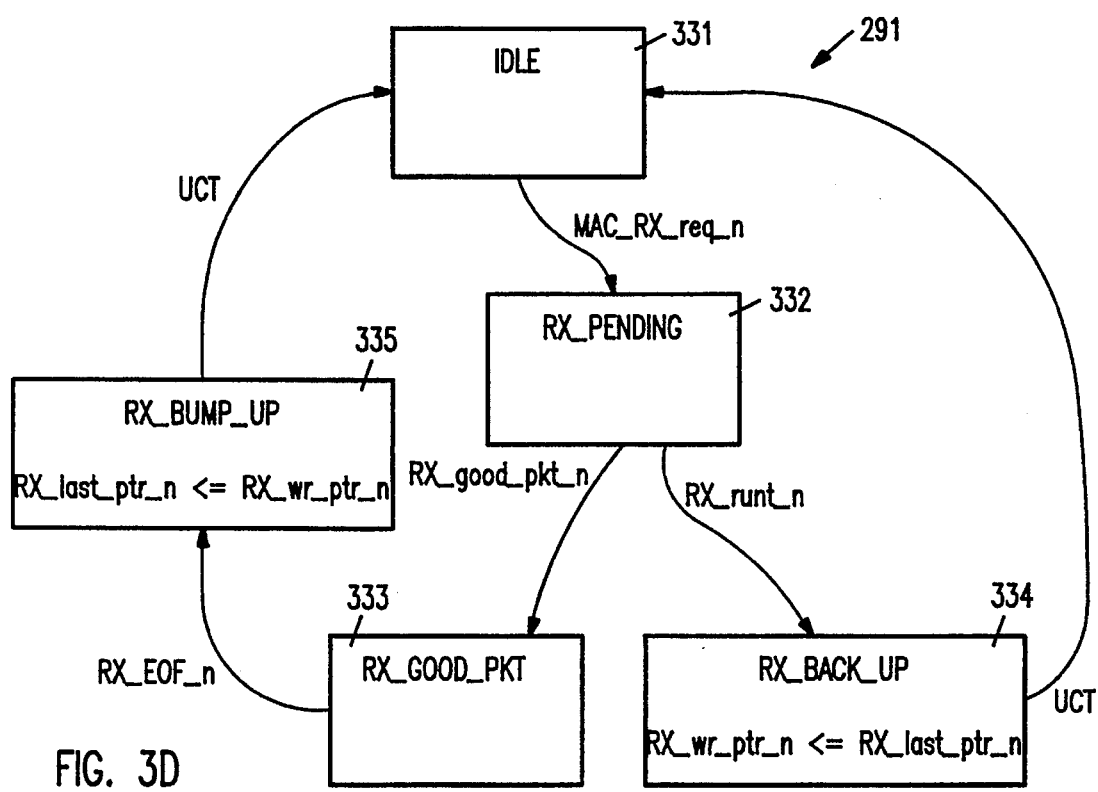

Runt filter circuit 291 has a state machine (FIG. 3D) similar to retransmit circuit 292, and goes from idle state 331 to receive pending state 332 when a FIFO request signal MAC_RX_req_n on status bus 291S goes active. Runt filter circuit 291 stays in state 332 while multi-MAC 286 is receiving data. Then runt filter circuit 291 goes from state 332 to receive good state 333 when a receive good packet signal RX_good_pkt_n on status bus 291S goes active or alternatively to receive backup state 334 when a runt received signal RX_runt_n on status bus 291S goes active. Runt filter circuit 291 stays in receive good state 333 until a receive end of frame signal RX_EOF_n on status bus 291S goes active and then goes to receive bump up state 335. In state 335, runt filter circuit 291 updates last pointer 231L to the value of write pointer 231R and then unconditionally transfers to idle state 331.

To screen runt packets, FIFO requester 289 can apply a separate threshold at the beginning of a packet, or use a normal threshold if the system screens runts. In one specific embodiment, FIFO requester 289 implements two FIFO thresholds, to allow a FIFO counter to initially go up to a first predetermined value, for example 64 bytes and subsequently allow the FIFO counter to only go up to a second predetermined value, for example 4 bytes. Such a two FIFO threshold method allows runt packets to be detected before a packet's data is transferred out of multi-FIFO 200 and also improves efficiency by generating the FIFO request port signal on a low threshold that can be critical, for example depending on the latency between the FIFO request port signal and a response from the system.

A group in SRAM 210 accumulates data until first address generator 220 receives a signal such as End of Frame (EOF) from multi-MAC 286. With such a signal from multi-MAC 286 if the FIFO threshold is crossed, FIFO requester 289 asserts a signal on receive FIFO request port 290 that is coupled to bus interface unit 284 and the system then reads the receive FIFO group's data.

BIU 284 can assert a signal on receive FIFO request port 290 that is coupled to the system when the group is filled to the programmed threshold, and keep the request port signal asserted for a threshold's number of transfers. For example, with a 32 byte threshold, the request signal is asserted for 8 32 bit transfers. If after a burst transfer is completed, the FIFO threshold is still exceeded the request port signal can be deasserted for two clocks and then reasserted.

The burst access support by second address generator 225 allows the bandwidth of second FIFO data bus 216 and thus system bus 285 to be high and eliminates or reduces a system's wait-states to memory. Also, the direct connection of system bus 285 to multi-FIFO 200 results in better layout by eliminating a prior art bus that was conventionally used to access multiple FIFOs in prior art devices.

At the end of transferring the packet out of a receive FIFO's group, multi-MAC 286 can append packet status by loading this information into the group after the receive packet. BIU 284 can assert a pin EOF on the last transfer of a frame's CRC by decoding tag bits of the word being transferred, and subsequently transfer the packet status on the next bus transfer cycle. The packet status contains the packet length, and any error indication if applicable. If an end of packet is received, and a FIFO threshold has not been reached, then FIFO requester 289 senses a tag bit EOF and asserts the signal on receive FIFO request port 290 and the group is emptied by the system. Such a tag bit can be appended by multi-MAC 286.

If the received packet has a frame alignment error, or a CRC error first address generator 220 allows the packet (including a status word) to be completely transferred from the group.

Packets can be transmitted by multi-MAC 286 when data is available in a transmit FIFO group. The system can keep the transmit FIFO's group full to avoid underruns.

Figure 4B:
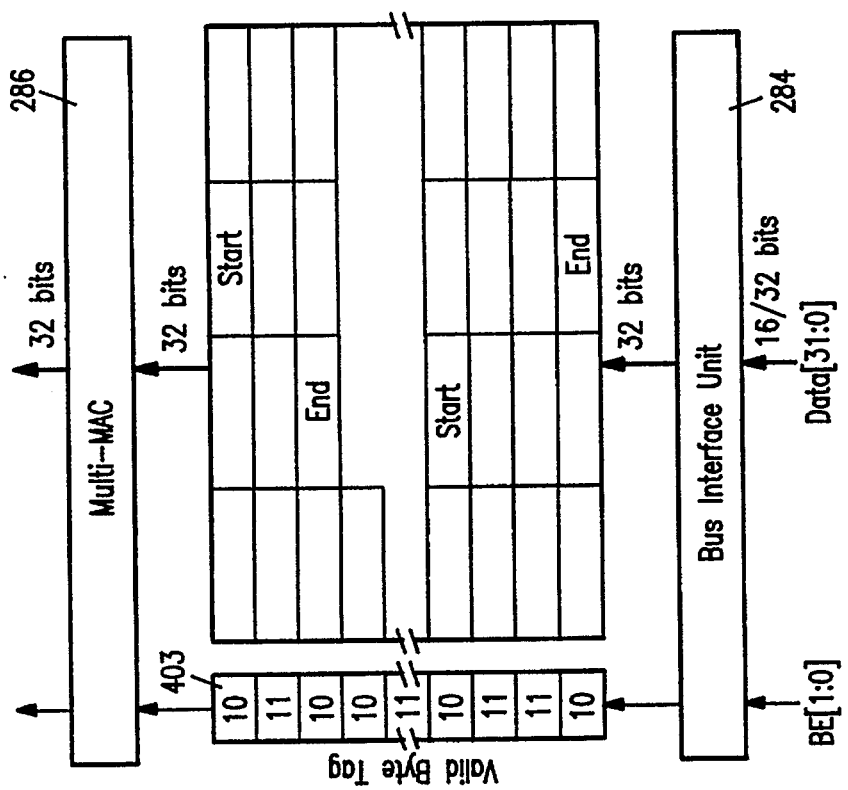
FIGS. 4A and 4B illustrate the format of data stored in the transmit and receive groups of SRAM 210 of FIG. 2B in one specific embodiment.
Figure 4A:
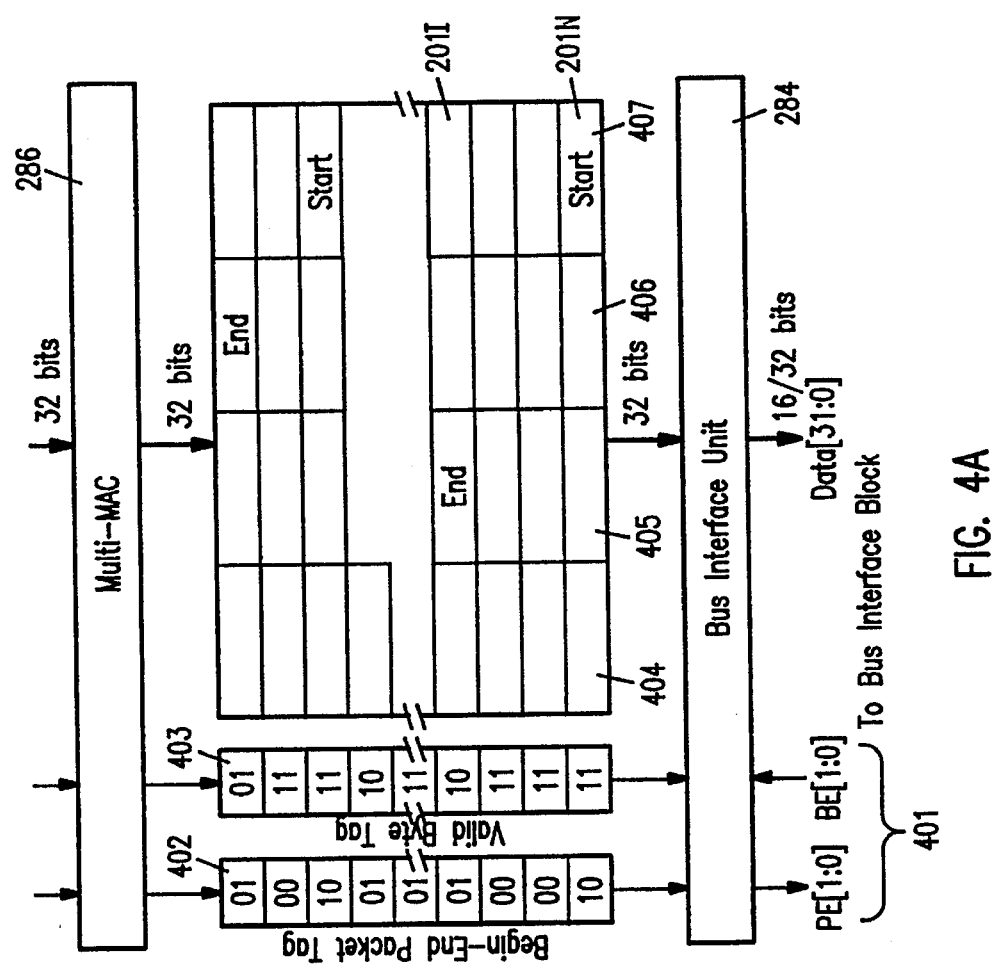

Either a receive FIFO's group or a transmit FIFO's group can contain several short packets at one time, as shown in FIGS. 4A and 4B. Therefore, every group's storage location includes tag bits 401, such as status bits 402 and byte valid bits 403 that indicate the start and stop point of the packets. Byte valid bits 403 are encoded, so that bits "11" indicate that bytes in all byte lanes 404–407 are valid as indicated in storage element and bits "10" indicate that only three bytes are valid, for example in lanes 405–407 of storage element 201I.

If several packets are loaded into a transmit FIFO's group, (FIG. 4B) as indicated by the start and stop bits of each packet, multi-MAC 286 automatically unloads the group's data without intervention of the CPU. Multi-MAC 286 inserts the necessary interference gap times (e.g. as per the CSMA/CD protocol). Thus multiple short packets can be queued in a transmit FIFO's group for automatic transmission.

As the beginning or end of a packet may appear on odd byte boundaries, status bits 402 indicate which bytes are valid. Such indication only enables empty locations at the beginning or end of a packet. When a packet ends, the next packet starts at some place within the next FIFO double word.

It is to be understood that the above description is intended to be illustrative and not restrictive. Many variations of the invention will become apparent to those of skill in the art upon review of this disclosure.

Although one embodiment of multi-FIFO 200 interfaces with multi-MAC 286, other embodiments of multi-FIFO can interface with conventional media-access-controllers (conventional MACs) which can be modified to supply various signals needed by multi-FIFO 200. Conventional MACs monitor data transmission, and can be modified to drive, for example a signal to multi-FIFO 200 in case of a collision, for retransmission of a lost packet and a different signal to continue transmission, if the number of transmitted bytes exceeds 64. Similarly, conventional MACs monitor receipt of data, and can be modified to drive, for example a signal to multi-FIFO 200 in case of a runt packet if the number of received bytes is lower than a threshold and a different signal to continue receipt if the number of received bytes equals or exceeds the threshold.

Although one implementation of a multi-FIFO memory circuit has been disclosed based on two specific state machines, any types of hardware or software can be used in other embodiments. Moreover, although the multi-FIFO memory circuit has been disclosed as being used to couple a personal computer's system bus and a number of ethernet buses, such a multi-FIFO memory circuit can be used with other buses in other embodiments. Therefore numerous modifications and adaptations of this invention are covered by the appended claims.

We claim:

1. A multi-first-in-first-out memory circuit comprising:

a memory comprising a plurality of first address terminals, a plurality of first data terminals, a plurality of second address terminals, a plurality of second data terminals and a plurality of groups, each group comprising a plurality of storage elements;

wherein said memory can supply data signals on said first data terminals driven by data values stored in a storage element identified by first address signals received on said first address terminals, and said memory can supply data signals on said second data terminals driven by data values stored in a storage element identified by second address signals received on said second address terminals;

further wherein said memory can use data signals received on said first data terminals to store data values in a storage element identified by first address signals received on said first address terminals, and said memory can use data signals received on said second data terminals to store data values in a storage element identified by second address signals received on said second address terminals;

a first address generator comprising a first address bus and a sequencer, said first address bus being coupled to said first address terminals;

wherein said sequencer allows said first address generator to supply first address signals of a storage element from each of said groups, said each group being successively selected by said sequencer from said plurality of groups; and a second address generator comprising a second address bus and a group request terminal, said second address bus being coupled to said second address terminals;

wherein said second address generator supplies second address signals of successive storage elements from a second group, said second group being identified by a request signal on said group request terminal.

2. The multi-first-in-first-out memory circuit of claim 1 further comprising:

a plurality of pairs of pointer registers, each pair corresponding to one of said groups, a first pointer register of each pair being coupled to said first address generator and a second pointer register of each pair being coupled to said second address generator;

wherein said first address generator uses a value encoded in a first pointer register to generate said first address signals and updates said value after said use; and further wherein said second address generator uses a value encoded in a second pointer register to generate said second address signals and updates said value after said use.

3. The multi-first-in-first-out memory circuit of claim 1 further comprising:

a plurality of read pointer registers, each read pointer register corresponding to one of said groups;

a plurality of write pointer registers, each write pointer register corresponding to one of said groups;

wherein a read pointer register corresponding to a group is coupled to one of said first address generator and said second address generator and a write pointer register corresponding to said group is coupled to the other of said first address generator and said second address generator; and further wherein for each group said first address generator uses a value encoded in one of said read pointer register and said write pointer register to generate said first address signals and said second address generator uses a value encoded in the other of said read pointer register and said write pointer register of one of said groups to generate said second address signals.

4. The multi-first-in-first-out memory circuit of claim 1, wherein half of said groups are receive groups and the other half are transmit groups, each group comprising an equal number of storage elements;

wherein said first group is selected cyclically from said plurality of receive and transmit groups; and further wherein said second group is selected from said plurality of receive and transmit groups in response to said request signal.

5. The multi-first-in-first-out memory circuit of claim 1 further comprising:

a plurality of counter registers, each of said counter registers corresponding to one of said groups;

wherein one of said address generators increments a value encoded in a counter register when a data value is stored in a storage element of a group corresponding to said counter register and stores said incremented value in said counter register.

6. The multi-first-in-first-out memory circuit of claim 1 further comprising:

a plurality of counter registers, each of said counter registers corresponding to one of said groups;

wherein one of said address generators decrements a value encoded in a counter register when a data value is supplied from a storage element of a group corresponding to said counter register and stores said decremented value in said counter register.

7. The multi-first-in-first-out memory circuit of claim 1 further comprising:

a plurality of counter registers, each of said counter registers corresponding to one of said groups;

wherein neither of said address generators changes a value encoded in a counter register when during a common time period:

a data value is supplied from a storage element of a group corresponding to said counter register; and a data value is stored in a storage element of said group.

8. A method for accessing storage locations in a random-access-memory, said method comprising:

supplying first address signals of a storage location located in a first group of a plurality of groups of storage locations, said first group being successively selected from said plurality of groups; and supplying second address signals of successive storage elements located in a second group, said second group being identified by a request signal.

9. A method for accessing storage locations as recited in claim 8, the method further comprising:

using a value encoded in a first pointer register to generate said first address signals and updating said value after said use; and using a value encoded in a second pointer register to generate said second address signals and updating said value after said use.

* * * * *